Nov. 10, 1959  C. A. TUDBURY  2,912,553
INDUCTION MUFFLE FURNACE
Filed March 14, 1957
FIG. 1
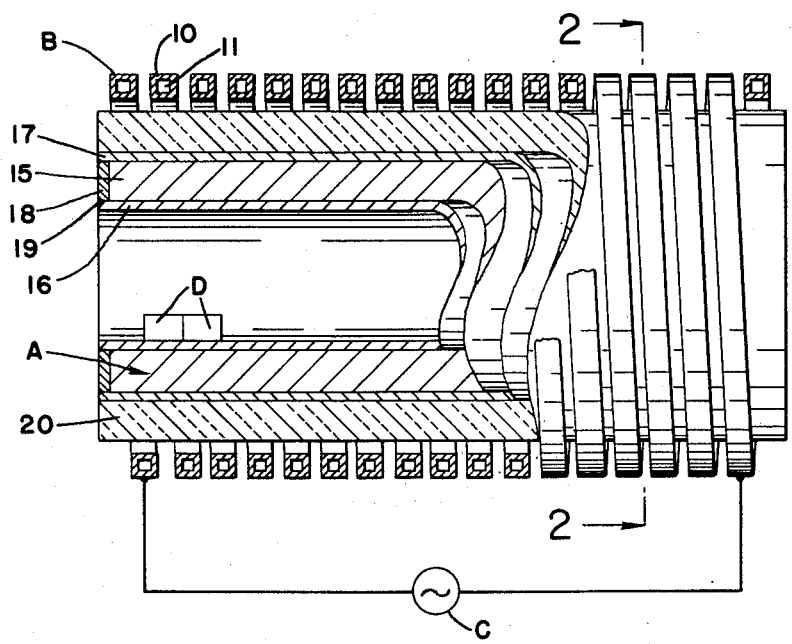
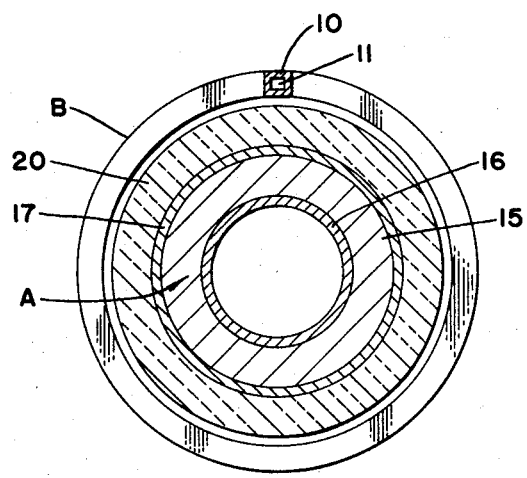
FIG. 2
INVENTOR.
CHESTER A. TUDBURY
BY
*Alfred C. Body*
ATTORNEY

United States Patent Office
2,912,553
Patented Nov. 10, 1959

2,912,553

INDUCTION MUFFLE FURNACE

Chester A. Tudbury, Lakewood, Ohio, assignor to The Ohio Crankshaft Company, Cleveland, Ohio, a corporation of Ohio Application March 14, 1957, Serial No. 645,959

6 Claims. (Cl. 219—10.49)

This invention pertains to the art of muffle furnaces and, more particularly, to a muffle furnace adapted to be heated by induced electrical currents.

The invention is particularly applicable to the heating of small metallic parts by placing them in a hollow tube heated by induced electrical currents having a frequency of 60 cycles per second, and will be described with particular reference thereto although it will be appreciated that the invention has broader applications.

In the art of induction muffle furnaces, it is conventional to provide a long, metallic tube which is positioned within an alternating current magnetic field. The magnetic field induces currents to flow in the tube and heats the tube to an elevated temperature. The small metallic parts are advanced axially through this tube either by rotating the tube continuously, by plungers, by tilting the tube, or a combination of all three. The parts within the tube are heated both by conduction and radiation as they move therethrough.

The tube is ordinarily made of stainless steel so that it will not rust or corrode due to its exposure to the atmosphere while heated to elevated temperatures.

One of the problems in such induction muffle furnaces has been the effect of the magnetic field on the parts within the tube itself. Thus, if the magnetic field penetrates to the interior of the tube, this field exerts a magnetic force on the parts. If the parts in the unheated state are magnetic, the forces exerted on them tend to pull them into the coil. However, when the parts have become non-magnetic due to heating above the Curie point, the magnetic forces tend to expel them from the tube. These forces, especially in complicated shaped workpieces, lead to mechanical jamming of the parts within the tube.

In order to prevent the magnetic forces from penetrating the walls of the tube, it has heretofore been conventional to provide a tube having a wall thickness which at the temperature of operation is greater than the reference depth of the frequency of the magnetic field. Thus, in any induction heating, the magnetic flux penetrates the metal within the coil to a depth proportional to the square root of the resistivity of the metal at the temperature of operation and inversely proportional to the square root of the frequency of the magnetic field. Thus, with frequencies of 3,000 to 10,000 cycles per second, it is possible to use a tube of stainless steel having a reasonably thin wall such as ¼ or ½ inch. However, electrical power at such frequencies is relatively expensive to produce. It is desirable, if possible, to employ 60 cycle per second electric current because of its ready availability. At such a frequency, and employing stainless tubes, the reference depth is relatively great and a stainless steel tube would have to have a wall thickness of four or five inches. Such a tube would be unduly expensive and unduly bulky.

The use of copper, which has a much lower resistivity than stainless steel, would enable a tube to be employed having a substantially thinner wall thickness, but copper, because of its tendency, when heated, to oxidize when exposed to the atmosphere, has heretofore been considered impossible to use for this purpose.

The present invention contemplates an induction muffle furnace which overcomes all of the above-referred to problems and enables the use of 60 cycle power with a wall thickness for the furnace of conventional economical values.

In accordance with the present invention, an induction muffle furnace is provided comprised of a hollow tube of relatively low resistivity metal, e.g. silver, copper, or aluminum, of a wall thickness which at the desired temperature of operation of the furnace is substantially greater than the reference depth of the frequency of the electrical power used to heat the tube, and a closed encasing layer of a metal having the ability to resist oxidization in the presence of the atmosphere when heated to the temperature of operation.

The principal object of the invention is the provision of a new and improved induction muffle furnace which does not corrode or rust when exposed to the atmosphere at elevated temperatures, which may be used with relatively low frequencies and a relatively low wall thickness without the magnetic flux penetrating to the interior.

Another object of the invention is the provision of a new and improved induction muffle furnace which is simple in construction, economical to manufacture, and simple and effective in operation.

Another object of the invention is the provision of a new and improved induction muffle furnace comprised of a copper tube having a wall thickness which, at the temperature of operation, is greater than the reference depth of the frequency of the energizing electrical power, and is completely encased inside and out with corrosion resistant metallic members.

The invention may take physical form in a number of different appearing parts, and combinations of parts, a preferred embodiment of which will be described in detail in this specification and illustrated in the accompanying drawing which is part hereof and wherein:

Figure 1 shows a side elevational view, partly in section, of an induction muffle furnace illustrating somewhat schematically a preferred embodiment of the invention, Figure 2 is a cross-sectional view of Figure 1 taken approximately on the line 2—2 of Figure 1.

Referring now to the drawings wherein the showings are for the purposes of illustrating a preferred embodiment of the invention only, and not for the purposes of limiting the invention, the figures show somewhat schematically an induction muffle furnace A positioned interiorly of an induction heating coil B connected to a suitable source C of alternating electric current.

The construction of the induction heating coil B forms no part of the present invention and may be constructed in accordance with conventional practices. Thus, in the drawing, the coil is comprised of a multi-turn coil of a copper conductor 10 having a continuous interior passage 11 through which cooling water may be continuously circulated. The conductor 10 is shown as being rectangular in cross-section but, of course, it may be any desired cross-sectional shape. Suitable insulation would normally be provided between each of the turns of the conductor and suitable mounting means as is known in the art, may be employed.

The muffle furnace A is positioned interiorly of the coil B and has an outer diameter close to, or approximating, that of the interior diameter of the coil B. The muffle furnace A is comprised of a solid tube 15 of a metal having a high electrical conductivity sandwiched between relatively thin layers 16, 17 of a metal having high corrosion resistance at elevated temperatures. Additionally, the inner layer 16 should have a high abrasion resistance. Both ends of the inner tube 15 are closed by means of a ring 18 of the same material as the layers 16, 17 and welded thereto as at 19. The result is an inner tube 15 of a metal having a high electrical conductivity completely encased in an outer metallic coating of a material having high corrosion resistance. By means of the welding at 19, it will be appreciated that the tube 15 is completely sealed from the outer atmosphere. Any oxygen or nitrogen which may exist between the layers 16, 17 and the tube 15 will be quickly used up when the furnace A is first heated to an elevated temperature and the slight amount of oxide or nitride formed will be of no disadvantage and as no more oxygen or nitrogen can enter the sealed space formed by the members 16, 17 and 18, no further problems from such elements can result.

The members 16, 17 and 18 may be relatively thin, their sole function being to protect the inner tube 15 from the effects of the atmosphere, as well as to provide an abrasion resistance to the movement of any parts D contained on the inside of the furnace A for the purpose of being heated therein. Stainless or Nichrome steel are satisfactory.

The tube 15 is preferably formed of copper which is readily available and has a very high electrical conductivity. Obviously, it could be formed of other high conductivity materials, such as, without limitation, silver or aluminum, aluminum being the preferable of the two because of its low cost. However, aluminum has a much lower melting temperature than does copper and its use will require a much lower temperature of operation than if copper were used for the tube 15.

The wall thickness of the tube 15 will depend upon a number of factors such as the frequency of the power source C, the temperature at which the furnace A will be operated, and whether or not any flux is to be allowed to penetrate into the interior of the furnace A. Preferably, and in accordance with the invention, however, the wall thickness of the tube 15 is sufficiently great to prevent a harmful amount of flux from penetrating into the interior of the furnace, e.g., a flux insufficient to move the parts relative to each other. In any event, the wall thickness of the tube 15 shall be greater than the reference depth of the magnetic field at the frequency of the power source C.

This reference depth is directly proportional to the square root of the resistivity of the metal, and inversely proportional to the square root of the frequency of the flux field. As conductivity is the inverse of resistivity, obviously the thickness will vary inversely to the square root of the conductivity of the metal.

The general formula for the reference depth in inches is equal to $3160 \sqrt{r/f}$ where $r$ is the resistivity in ohm-inches of the metal, and $f$ is the frequency in cycles per second. The actual reference depth will vary depending on the exterior dimensions of the furnace, but this formula is close enough for the purposes here.

For copper, which has a resistivity at room temperature of about $0.7 \times 10^{-6}$ ohms per inch, the reference depth is approximately 0.3 inch. At 1500° the resistivity is approximately five times that of room temperature and the reference depth is approximately 1.5 inches.

Thus, in accordance with the invention, the thickness of the wall 15 will be greater than $3160 \sqrt{r/f}$ where $r$ is in ohm inches at the desired temperature of the furnace operation, and $f$ is in cycles per second of the power source C.

As it is desired that no appreciable flux penetrate to the interior of the furnace A, the wall thickness 15 is preferably made approximately 1.5 times the actual reference depth.

With the arrangement described, all of the metal of the furnace will be heated to an elevated temperature. In order to prevent radiation losses, the entire furnace A is preferably enclosed in a hollow tube of heat insulation 20 and, if desired, the coil B may be embedded in this insulation.

The workpieces D may be moved through the furnace A in any desired manner such as by hydraulically operated plungers or by rotating the furnace A, or by any other known means.

The value of the present invention becomes particularly apparent when it is realized that if the furnace were made entirely of stainless or Nichrome steel, which has a resistivity almost fifty times as great as that of copper, the wall thickness would have to be at least seven times as great as that when employing the present invention. Obviously, such a wall thickness is completely impractical, and the cost of the stainless steel involved would make such an installation prohibitive.

The advantages of the invention will result for any, and all, frequencies of the power source C. However, as the frequencies of the power source C go down, the advantages become more apparent. It is particularly desirable, and a preferred embodiment of the invention contemplates that the frequency will be ordinary power frequencies of 60 cycles per second, and it is at this frequency where the present invention becomes of prime importance.

The invention has been described with reference to a preferred embodiment. Obviously, modifications and alterations will occur to others upon a reading and understanding of this specification, and it is my intention to include all such modifications and alterations insofar as they come within the scope of the appended claims.

Having thus described my invention, I claim:

1. A muffle furnace adapted to be heated by induced electrical currents of a predetermined frequency, said furnace comprised of a closed hollow tube of metals having a relatively low resistivity and selected from the class of silver, copper or aluminum, and completely enclosed in a layer of a metal having a higher resistivity and a resistance against corrosion or oxidization when heated to elevated temperatures in the presence of air, said low resistivity metal having a wall thickness in excess of $3160 \sqrt{r/f}$ wherein $r$ equals the resistivity of the metal of the tube in ohm inches at the desired temperature of operation of the furnace and $f$ equals the frequency of the energizing current.

2. A muffle furnace adapted to be heated by induced electrical currents, said furnace consisting of a closed hollow tube of copper and an outer enclosing layer covering all of the surfaces of said tube of a metal capable of resisting corrosion when heated in air to elevated temperatures, said copper tube having a wall thickness in excess of $3160 \sqrt{r/f}$ where $r$ equals the resistivity of copper at the desired temperature of operation of the furnace and $f$ equals the frequency of the energizing currents.

3. A muffle furnace adapted to be heated by 60 cycle induced currents, said furnace comprised of a closed hollow tube of copper having a wall thickness in excess of one inch and an outer covering overlying the inner and outer surfaces of said copper tube along the latter's length of a material capable of being heated in air without corroding.

4. The combination of claim 3 wherein said material is a stainless steel.

5. The combination of claim 3 wherein said material is a Nichrome steel.

6. A muffle furnace adapted to be heated by induced electrical current having a frequency of 60 cycles, said furnace being comprised of a closed hollow copper tube having a wall thickness in excess of one inch and means coating all the exposed surfaces of said copper tube capable of being heated in air without corroding or rusting, and an outer layer of heat insulating material surrounding said tube.

References Cited in the file of this patent

UNITED STATES PATENTS 2,181,274    Jackson et al.    Nov. 28, 1939
2,759,087    Lackner    Aug. 14, 1956
2,823,289    Beck    Feb. 11, 1958